United States Patent
Xu et al.

(10) Patent No.: US 10,142,652 B2
(45) Date of Patent: Nov. 27, 2018

(54) ENTROPY CODING MOTION VECTOR RESIDUALS OBTAINED USING REFERENCE MOTION VECTORS

(71) Applicant: GOOGLE LLC, Mountain View, CA (US)

(72) Inventors: Yaowu Xu, Saratoga, CA (US); Jingning Han, Santa Clara, CA (US)

(73) Assignee: GOOGLE LLC, Mountain View, CA (US)

( * ) Notice: Subject to any disclaimer, the term of this patent is extended or adjusted under 35 U.S.C. 154(b) by 228 days.

(21) Appl. No.: 15/147,053

(22) Filed: May 5, 2016

(65) Prior Publication Data

US 2017/0324978 A1 Nov. 9, 2017

(51) Int. Cl.

| H04N 7/12 | (2006.01) |
|---|---|
| H04N 19/56 | (2014.01) |
| H04N 19/513 | (2014.01) |
| H04N 19/91 | (2014.01) |
| H04N 19/176 | (2014.01) |
| H04N 19/573 | (2014.01) |
| H04N 19/583 | (2014.01) |

(52) U.S. Cl.
CPC ........... *H04N 19/56* (2014.11); *H04N 19/176* (2014.11); *H04N 19/513* (2014.11); *H04N 19/573* (2014.11); *H04N 19/583* (2014.11); *H04N 19/91* (2014.11)

(58) Field of Classification Search
CPC .... H04N 19/176; H04N 19/56; H04N 19/573; H04N 19/583
See application file for complete search history.

(56) References Cited

U.S. PATENT DOCUMENTS

| 7,095,344 B2 | 8/2006 | Sekiguchi et al. |
| 7,321,323 B2 | 1/2008 | Sekiguchi et al. |
| 7,408,488 B2 | 8/2008 | Sekiguchi et al. |
| 7,460,042 B2 | 12/2008 | Oshikiri et al. |

(Continued)

FOREIGN PATENT DOCUMENTS

WO 2007079964 A1 7/2007

OTHER PUBLICATIONS

Vivienne Sze, Joint Algorithm-Architecture Optimization of CABAC to Increase Speed and Reduce Area Cost, 2011 IEEE International Conference of Acoustics, Speed and Signal Processing, 1988 ICASSP-88, 1988 International Conference on May 2011.*

(Continued)

*Primary Examiner* — Jessica M Prince
(74) *Attorney, Agent, or Firm* — Young Basile Hanlon & MacFarlane, P.C.

(57) ABSTRACT

Techniques are described to code motion vectors using reference motion vectors to reduce the amount of bits needed. One method includes determining, for a current block of the video bitstream, a reference motion vector from a varying number of candidate reference motion vectors, wherein the reference motion vector is associated with a reference block and includes a predicted portion and a residual portion; selecting a probability context model for the current block by evaluating the residual portion of the reference motion vector with one or more thresholds; and entropy decoding, for the current block using a processor, a motion vector residual associated with the current block using the probability context model.

15 Claims, 8 Drawing Sheets

(56) References Cited

U.S. PATENT DOCUMENTS

| | | | |
|---|---|---|---|
| 7,469,070 | B2 | 12/2008 | Winger |
| 9,781,445 | B2* | 10/2017 | Kim .................. H04N 19/52 |
| 2011/0129016 | A1 | 6/2011 | Sekiguchi et al. |
| 2012/0307905 | A1 | 12/2012 | Kim et al. |
| 2014/0177707 | A1* | 6/2014 | George .............. H04N 19/52 375/240.03 |
| 2015/0055706 | A1* | 2/2015 | Xu .................. H04N 19/52 375/240.16 |

OTHER PUBLICATIONS

Laroche et al., "RD Optimized Coding for Motion Vector Predictor Selection", IEEE Transactions on Circuits and Systems for Video Technology, vol. 18, No. 9, Sep. 2008.

Sze, "Joint Algorithm-Architecture Optimization of CABAC", JCT-VC of ITU-T SG16 WP3 and ISO/IEC JTC1/SC29/WG11, 5th Meeting, Geneva, CH, Mar. 16-23, 2011, 7 pp.

Sze et al., "Joint Algorithm-Architecture Optimization of CABAC to Increase Speed and Reduce Area Cost", 2011 IEEE International Conference on Acoustics, Speech and Signal Processing, Prague, Czech Republic, May 22-27, 2011, pp. 1577-1580.

Sze et al., "A Highly Parallel and Scalable CABAC Decoder for Next Generation Video Coding", IEEE Journal of Solid-State Circuits, vol. 47, No., Jan. 1, 2012, pp. 8-22.

Sullivan et al., "Overview of the High Efficiency Video Coding (HEVC) Standard", IEEE Transactions on Circuits and Systems for Video Technology, Vo. 22, No. 12, Dec. 1, 2012, pp. 1649-1668.

Lin et al, "Improved Advanced Motion Vector Prediction", JCT-VC of ITU-T SG16 WP3 and ISO/IEC JTC1/SC29/WG11, 4th Meeting: Daegu, Korea, Jan. 20-28, 2011, 8 pgs.

Kim et al., "An Efficient Motion Vector Coding Scheme Based on Minimum Bitrate Prediction", IEEE Transactions on Image Processing, vol. 8, No. 8, Aug. 1, 1999, pp. 1117-1120.

Bankoski, et al., "Technical Overview of VP8, An Open Source Video Codec for the Web", Jul. 11, 2011, 6 pp.

Bankoski et al., "VP8 Data Format and Decoding Guide", Independent Submission RFC 6389, Nov. 2011, 305 pp.

Bankoski et al., "VP8 Data Format and Decoding Guide draft-bankoski-vp8-bitstream-02", Network Working Group, Internet-Draft, May 18, 2011, 288 pp.

Series H: Audiovisual and Multimedia Systems, Coding of moving video: Implementors Guide for H.264: Advanced video coding for generic audiovisual services, International Telecommunication Union, Jul. 30, 2010, 15 pp.

"Introduction to Video Coding Part 1: Transform Coding", Mozilla, Mar. 2012, 171 pp.

"Overview VP7 Data Format and Decoder", Version 1.5, On2 Technologies, Inc., Mar. 28, 2005, 65 pp.

Series H: Audiovisual and Multimedia Systems, Infrastructure of audiovisual services—Coding of moving video, Advanced video coding for generic audiovisual services, International Telecommunication Union, Version 11, Mar. 2009. 670 pp.

Series H: Audiovisual and Multimedia Systems, Infrastructure of audiovisual services—Coding of moving video, Advanced video coding for generic audiovisual services, International Telecommunication Union, Version 12, Mar. 2010, 676 pp.

Series H: Audiovisual and Multimedia Systems, Infrastructure of audiovisual services—Coding of moving video, Amendment 2: New profiles for professional applications, International Telecommunication Union, Apr. 2007, 75 pp.

Series H: Audiovisual and Multimedia Systems, Infrastructure of audiovisual services—Coding of moving video, Advanced video coding for generic audiovisual services, Version 8, International Telecommunication Union, Nov. 1, 2007, 564 pp.

Series H: Audiovisual and Multimedia Systems, Infrastructure of audiovisual services—Coding of moving video, Advanced video coding for generic audiovisual services, Amendment 1: Support of additional colour spaces and removal of the High 4:4:4 Profile, International Telecommunication Union, Jun. 2006, 16 pp.

Series H: Audiovisual and Multimedia Systems, Infrastructure of audiovisual services—Coding of moving video, Advanced video coding for generic audiovisual services, Version 1, International Telecommunication Union, May 2003, 282 pp.

Series H: Audiovisual and Multimedia Systems, Infrastructure of audiovisual services—Coding of moving video, Advanced video coding for generic audiovisual services, Version 3, International Telecommunication Union, Mar. 2005, 343 pp.

"VP6 Bitstream and Decoder Specification", Version 1.02, On2 Technologies, Inc., Aug. 17, 2006, 88 pp.

"VP6 Bitstream and Decoder Specification", Version 1.03, On2 Technologies, Inc., Oct. 29, 2007, 95 pp.

"VP8 Data Format and Decoding Guide, WebM Project", Google On2, Dec. 1, 2010, 103 pp.

Marpe et al., "Video Compression Using Context-Based Adaptive Arithmetic Coding", IEEE 2001 International Conference on Image Processing, vol. 3, Feb. 2001, pp. 558-561.

* cited by examiner

700

```
┌─────────────┬──────────────────┐
│             │       R0         │
│   R2        │     (pmv0)       │
│  (pmv2)     │ = (ppmv)+(pres0) │
│             │                  │
├─────────────┼──────────────────┤
│             │       B          │
│   R1        │      (mv)        │
│  (pmv1)     │ = (pmv0)+(res0)  │
│             │                  │
└─────────────┴──────────────────┘
```

| MAGNITUDE   | 0  | 1  | 2  | 3  | 4  | 5  | ... |
|-------------|----|----|----|----|----|----|-----|
| CATEGORY 0: | 80 | 60 | 40 | 40 | 40 | 40 | ... |
| CATEGORY 1: | 50 | 40 | 30 | 30 | 30 | 30 | ... |

*FIG. 8*

ENTROPY CODING MOTION VECTOR RESIDUALS OBTAINED USING REFERENCE MOTION VECTORS

BACKGROUND

Digital video streams may represent video using a sequence of frames or still images. Digital video can be used for various applications including, for example, video conferencing, high definition video entertainment, video advertisements, or sharing of user-generated videos. A digital video stream can contain a large amount of data and consume a significant amount of computing or communication resources of a computing device for processing, transmission or storage of the video data. Various approaches have been proposed to reduce the amount of data in video streams, including compression and other encoding techniques.

SUMMARY

This disclosure relates generally to encoding and decoding video data and more particularly relates to video coding using reference motion vectors.

An aspect of the disclosure herein is a method for decoding a video bitstream. The method includes determining, for a current block of the video bitstream, a reference motion vector from a varying number of candidate reference motion vectors, wherein the reference motion vector is associated with a reference block and includes a predicted portion and a residual portion; selecting a probability context model for the current block by evaluating the residual portion of the reference motion vector with one or more thresholds; and entropy decoding, for the current block using a processor, a motion vector residual associated with the current block using the probability context model.

Another aspect of the disclosure herein is a method for encoding a video stream. The method includes selecting, for a current block of the video bitstream, a reference motion vector from a varying number of candidate reference motion vectors, wherein the reference motion vector is associated with a reference block and includes a predicted portion and a residual portion; selecting a probability context model for the current block by evaluating the residual portion of the reference motion vector with one or more thresholds; and entropy encoding, for the current block using a processor, a motion vector residual associated with the current block using the probability context model.

Another aspect of the disclosure herein is an apparatus for decoding a video bitstream. The apparatus includes a memory and a processor configured to execute instructions stored in the memory to determine, for a current block of the video bitstream, a reference motion vector from a varying number of candidate reference motion vectors, wherein the reference motion vector is associated with a reference block and includes a predicted portion and a residual portion; select a probability context model for the current block by evaluating the residual portion of the reference motion vector with one or more thresholds; and entropy decode, for the current block using a processor, a motion vector residual associated with the current block using the probability context model.

Variations in these and other aspects of the disclosure will be described in additional detail hereafter.

BRIEF DESCRIPTION OF THE DRAWINGS

The description herein makes reference to the accompanying drawings wherein like reference numerals refer to like parts throughout the several views.

FIG. 7 is a diagram of an example frame including a current block used to explain the processes of FIGS. 5 and 6.

FIG. 8 is a diagram of example probability context models used to explain the processes of FIGS. 5 and 6.

DETAILED DESCRIPTION

Figure 1:
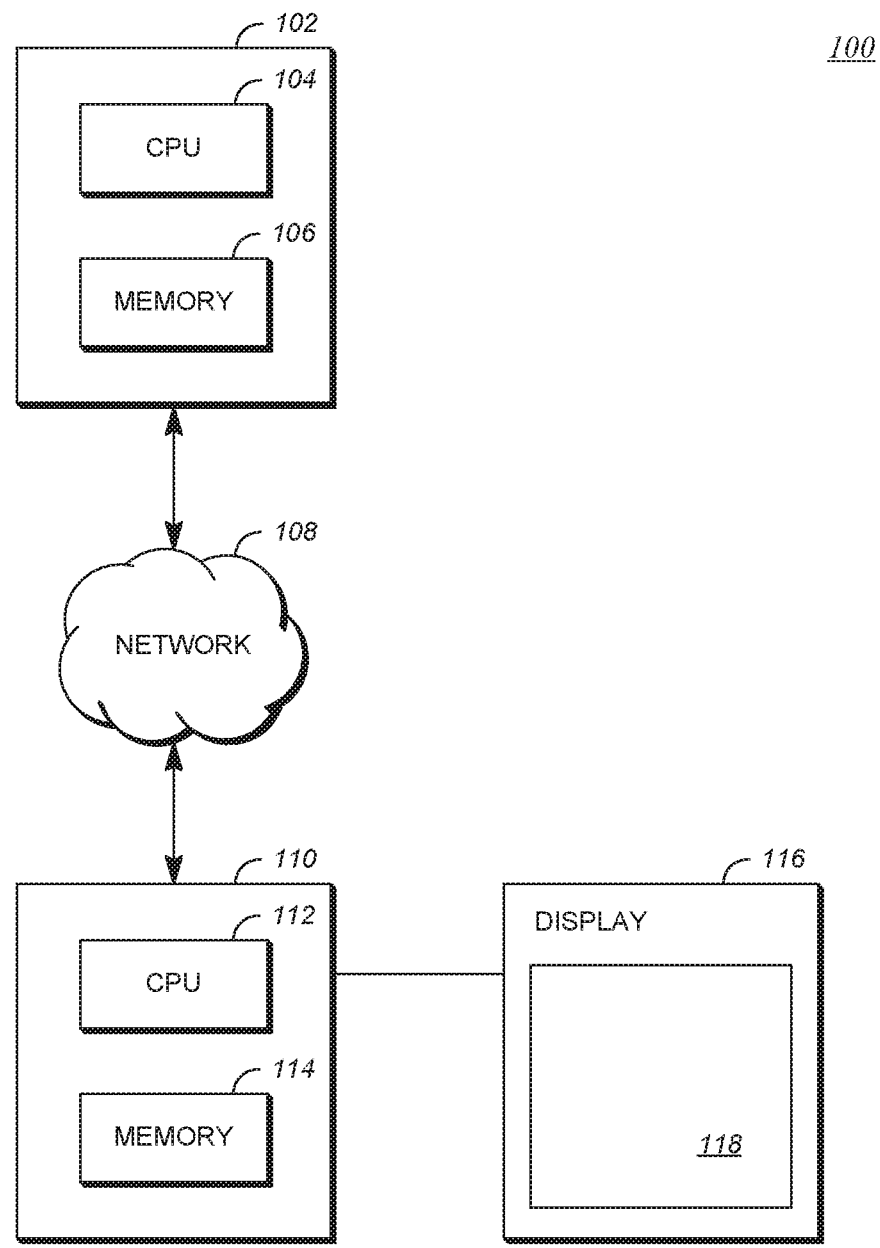
FIG. 1 is a schematic of a video encoding and decoding system in accordance with implementations of this disclosure.

Compression schemes related to coding video streams may include breaking each image into blocks and generating a digital video output bitstream using one or more techniques to limit the information included in the output. A received bitstream can be decoded to re-create the blocks and the source images from the limited information. Encoding a video stream, or a portion thereof, such as a frame or a block, can include using temporal and spatial similarities in the video stream to improve coding efficiency. For example, a current block of a video stream may be encoded based on a previously encoded block in the video stream by predicting motion and color information for the current block based on the previously encoded block and identifying a difference (residual) between the predicted values and the current block. In this way, only the residual and parameters used to generate it need be added to the bitstream instead of including the entirety of the current block. This technique may be referred to as inter prediction.

One of the parameters in inter prediction is a motion vector that represents the spatial displacement of the previously coded block relative to the current block. The motion vector can be identified using a method of motion estimation, such as a motion search. In motion search, a portion of a reference frame can be translated to a succession of locations to form a prediction block that can be subtracted from a portion of a current frame to form a series of residuals. The X and Y translations corresponding to the location having the smallest residual can be selected as the motion vector. Bits representing the motion vector can be included in the encoded bitstream to permit a decoder to reproduce the prediction block and decode the portion of the encoded video bitstream associated with the motion vector.

For video compression schemes, the coding of the motion vectors often consumes a large percentage of the overall bitrate, especially for video streams encoded at lower data rates or higher compression ratios. To improve the encoding efficiency, a motion vector can be differentially encoded using a reference motion vector, i.e., only the difference (residual) between the motion vector and the reference motion vector is encoded. In some instances, the reference motion vector can be selected from previously used motion vectors in the video stream, for example, the last non-zero motion vector from neighboring blocks. Selecting a previously used motion vector to encode a current motion vector can further reduce the number of bits included in the encoded video bitstream and thereby reduce transmission and storage bandwidth requirements. Motion vector referencing modes allow a coding block to infer motion information from previously coded neighboring blocks.

According to implementations of this disclosure, for a block of a video bitstream, a reference motion vector can be selected from a varying (dynamically adjustable) number of candidate reference motion vectors. The candidate reference motion vectors can include motion vectors from any previously coded (or decoded) blocks in the video stream, such as a block from a previously coded (or decoded) frame, or a block from the same frame that has been previously encoded (or decoded). In some implementations, the candidate reference blocks can include a co-located block (of the current block) and its surrounding blocks in a reference frame. For example, the surrounding blocks can include a block to the right, bottom-left, bottom-right of, or below the co-located block. One or more candidate reference frames, including single and compound reference frames, can be used. Having a dynamically adjustable number of candidate reference frames and/or candidate reference blocks allows the codec to adapt to the variations, and adjust the number of candidates based on indicators such as motion characteristics of each individual block and its surroundings, which can improve the coding efficiency.

According to the implementations, probability context models can be used for entropy coding of a motion vector residual for a current block. Contexts, such as previously-coded motion vector residuals in the neighborhood of a block, can be used to select the probability context models, which can provide additional bitrate savings. The contexts for entropy coding of motion vectors can be based on, for example, motion intensities indicated by the motion vector residuals of the reference blocks. For example, when the selected reference block is coded with a small motion vector residual (e.g., below a certain threshold), it is a good indication that the current block may have a relatively small motion vector residual. In some implementations, to select a probability context model from multiple probability context models for encoding the motion vector residual, a magnitude of a residual of the reference motion vector can be compared with the one or more thresholds to determine an indication of motion intensity for the current block. The probability context models can include predetermined probability distributions and be updated based on actual coded (decoded) values.

Based on the selected probability context model, the probability value for entropy coding (or decoding) of the motion vector residual can be determined using the magnitude of the motion vector residual. Entropy coding can use techniques such as arithmetic coding.

In some implementations, a reference motion vector can be selected from candidate reference motion vectors based on the distance between the reference block and the current block and the popularity of the reference motion vector. For example, the distance between the reference block and the current block can be based on the spatial displacement between the pixels in the previously coded block and the collocated pixels in the current block, measured in the unit of pixels. For example, the popularity of the motion vector can be based on the amount of previously coded pixels that use the motion vector. The more previously coded pixels that use the motion vector, the higher the popularity of the motion vector. In one example, the popularity value is the number of previously coded pixels that use the motion vector. In another example, the popularity value is a percentage of previously coded pixels within an area that use the motion vector.

According to the teachings herein, a reference motion vector can be selected so as to reduce the number of bits required to encode a motion vector determined by, for example, motion search techniques. The teachings herein take advantage of temporal motion continuity to reduce the number of bits required to transmit motion vector information by referring to motion vectors from adjacent and non-adjacent video frames. In some implementations, the decoder can have all the information the encoder has to select the reference motion vector, allowing the selection of the reference motion vector without explicit transfer of further information. The coded motion vector residual can be included in the encoded bitstream to permit a decoder to reproduce the prediction block and decode the portion of the encoded video bitstream associated with the motion vector. Other details are described herein after first describing an environment in which the disclosure may be implemented.

FIG. 1 is a schematic of a video encoding and decoding system 100 in which aspects of the disclosure can be implemented. An exemplary transmitting station 102 can be, for example, a computer having an internal configuration of hardware including a processor such as a central processing unit (CPU) 104 and a memory 106. The CPU 104 is a controller for controlling the operations of the transmitting station 102. The CPU 104 can be connected to the memory 106 by, for example, a memory bus. The memory 106 can be read only memory (ROM), random access memory (RAM) or any other suitable memory device. The memory 106 can store data and program instructions that are used by the CPU 104. Other suitable implementations of the transmitting station 102 are possible. For example, the processing of the transmitting station 102 can be distributed among multiple devices.

A network 108 connects the transmitting station 102 and a receiving station 110 for encoding and decoding of the video stream. Specifically, the video stream can be encoded in the transmitting station 102 and the encoded video bitstream can be decoded in the receiving station 110. The network 108 can be, for example, the Internet. The network 108 can also be a local area network (LAN), wide area network (WAN), virtual private network (VPN), a cellular telephone network or any other means of transferring the video stream from the transmitting station 102 to, in this example, the receiving station 110.

The receiving station 110 can, in one example, be a computer having an internal configuration of hardware including a processor such as a CPU 112 and a memory 114. The CPU 112 is a controller for controlling the operations of receiving station 110. The CPU 112 can be connected to the memory 114 by, for example, a memory bus. The memory 114 can be ROM, RAM or any other suitable memory device. The memory 114 can store data and program instructions that are used by the CPU 112. Other suitable implementations of the receiving station 110 are possible. For example, the processing of the receiving station 110 can be distributed among multiple devices.

A display 116 configured to display a video stream can be connected to receiving station 110. The display 116 can be implemented in various ways, including by a liquid crystal display (LCD), a cathode-ray tube (CRT), or a light emitting diode display (LED), such as an organic LED (OLED) display. The display 116 is coupled to the CPU 112 and can be configured to display a rendering 118 of the video stream decoded in the receiving station 110.

Other implementations of the encoding and decoding system 100 are also possible. For example, one implementation can omit the network 108 and/or the display 116. In another implementation, a video stream can be encoded and then stored for transmission at a later time by the receiving station 110 or any other device having memory. In one implementation, the receiving station 110 receives (e.g., via the network 108, a computer bus, or some communication pathway) the encoded video stream and stores the video stream for later decoding. In another implementation, additional components can be added to the encoding and decoding system 100. For example, a display or a video camera can be attached to the transmitting station 102 to capture the video stream to be encoded.

Figure 2:
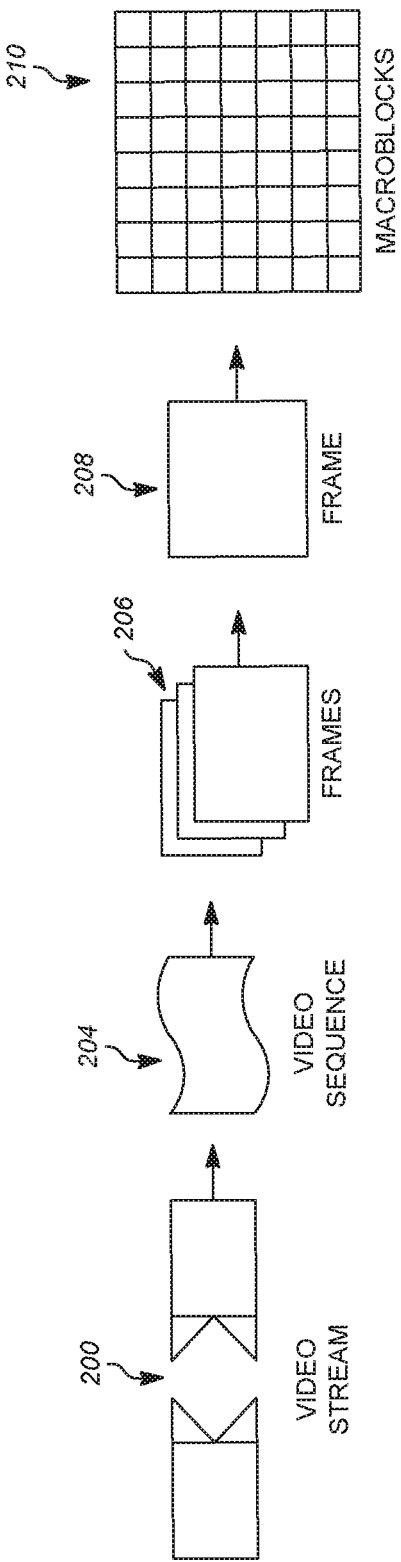
FIG. 2 is a diagram of an example video stream to be encoded and decoded in accordance with implementations of this disclosure.

FIG. 2 is a diagram of an example video stream 200 to be encoded and decoded. The video stream 200 (also referred to herein as video data) includes a video sequence 204. At the next level, the video sequence 204 includes a number of adjacent frames 206. While three frames are depicted in the adjacent frames 206, the video sequence 204 can include any number of adjacent frames. The adjacent frames 206 can then be further subdivided into individual frames, e.g., a frame 208. The frame 208 can capture a scene with one or more objects, such as people, background elements, graphics, text, a blank wall, or any other information.

At the next level, the frame 208 can be divided into a set of blocks 210, which can contain data corresponding to, in some of the examples described below, an 8×8 pixel group in the frame 208. The block 210 can also be of any other suitable size such as a block of 16×8 pixels, a block of 8×8 pixels, a block of 16×16 pixels, a block of 4×4 pixels, or of any other size. Unless otherwise noted, the term 'block' can include a macroblock, a subblock (i.e., a subdivision of a macroblock), a segment, a slice, a residual block or any other portion of a frame. A frame, a block, a pixel, or a combination thereof can include display information, such as luminance information, chrominance information, or any other information that can be used to store, modify, communicate, or display the video stream or a portion thereof.

Figure 3:
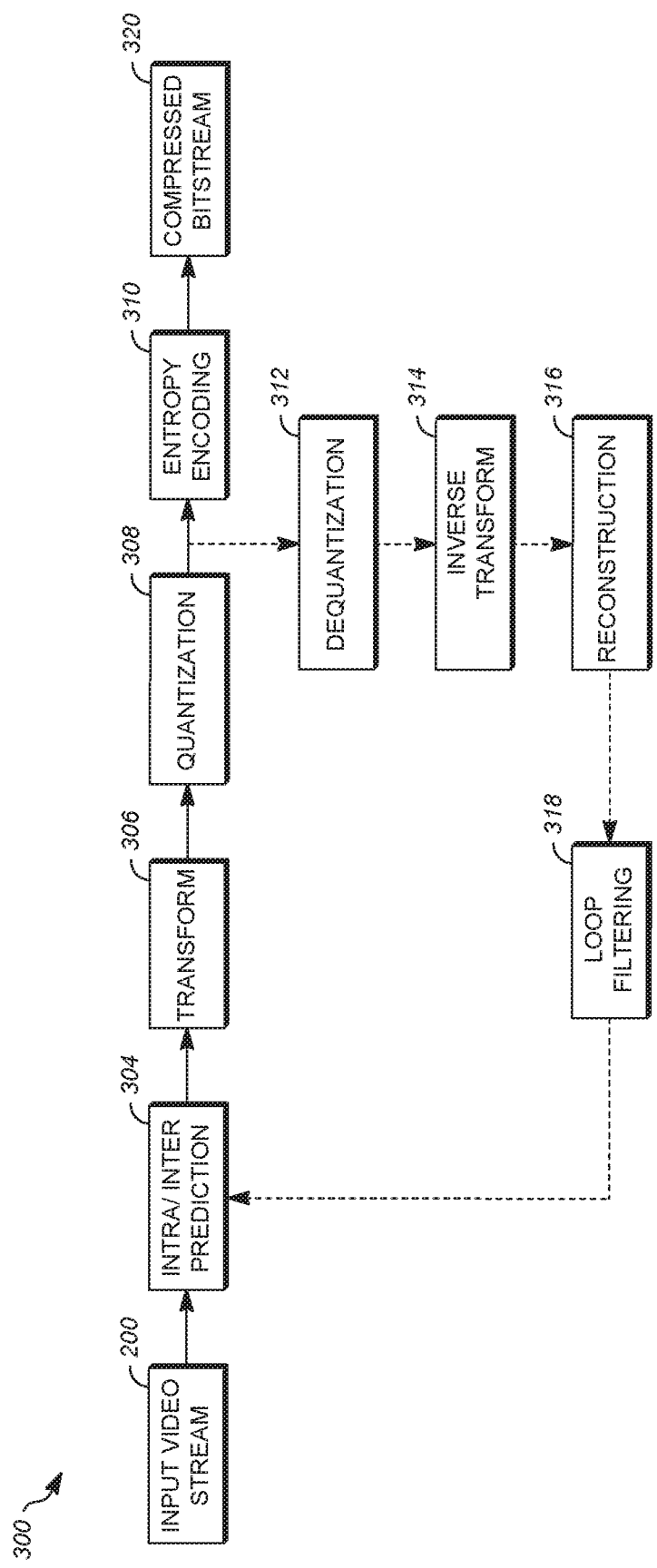
FIG. 3 is a block diagram of an encoder in accordance with implementations of this disclosure.

FIG. 3 is a block diagram of an encoder 300 in accordance with implementations of this disclosure. The encoder 300 can be implemented, as described above, in the transmitting station 102 such as by providing a computer software program stored in the memory 106, for example. The computer software program can include machine instructions that, when executed by the CPU 104, cause the transmitting station 102 to encode video data in the manner described in FIG. 3. The encoder 300 can also be implemented as specialized hardware in, for example, the transmitting station 102. The encoder 300 has the following stages to perform the various functions in a forward path (shown by the solid connection lines) to produce an encoded or a compressed bitstream 320 using the video stream 200 as input: an intra/inter prediction stage 304, a transform stage 306, a quantization stage 308, and an entropy encoding stage 310. The encoder 300 may include a reconstruction path (shown by the dotted connection lines) to reconstruct a frame for encoding of future blocks. In FIG. 3, the encoder 300 has the following stages to perform the various functions in the reconstruction path: a dequantization stage 312, an inverse transform stage 314, a reconstruction stage 316, and a loop filtering stage 318. Other structural variations of the encoder 300 can be used to encode video stream 200.

When the video stream 200 is presented for encoding, each frame 208 within video stream 200 can be processed in units of blocks. Referring to FIG. 3, at the intra/inter prediction stage 304, each block can be encoded using either intra prediction (i.e., within a single frame) or inter prediction (i.e. from frame to frame). In either case, a prediction block can be formed. The prediction block is then subtracted from the block to produce a residual block (also referred to herein as residual).

Intra prediction (also referred to herein as intra-prediction or intra-frame prediction) and inter prediction (also referred to herein as inter-prediction or inter-frame prediction) are techniques used in modern image/video compression schemes. In the case of intra-prediction, a prediction block can be formed from samples in the current frame that have been previously encoded and reconstructed. In the case of inter-prediction, a prediction block can be formed from samples in one or more previously constructed reference frames, such as the last frame (i.e., the adjacent frame immediately before the current frame), a golden frame or a constructed or alternate frame described below.

The prediction block is then subtracted from the current block. The difference, or residual, is then encoded and transmitted to decoders. Image or video codecs may support many different intra and inter prediction modes; each block may use one of the prediction modes to obtain a prediction block that is most similar to the block to minimize the information to be encoded in the residual so as to re-create the block. The prediction mode for each block of transform coefficients can also be encoded and transmitted so a decoder can use the same prediction mode(s) to form prediction blocks in the decoding and reconstruction process.

The prediction mode may be selected from one of multiple intra-prediction modes. Alternatively, the prediction mode may be selected from one of multiple inter-prediction modes using one or more reference frames including, for example, last frame, golden frame, alternative reference frame, or any other reference frame in an encoding scheme. The bitstream syntax supports three categories of inter prediction modes. The inter prediction modes can include, for example, a mode (sometimes called ZERO_MV mode) in which a block from the same location within a reference frame as the current block is used as the prediction block; a mode (sometimes called a NEW_MV mode) in which a motion vector is transmitted to indicate the location of a block within a reference frame to be used as the prediction block relative to the current block; or a mode (sometimes called a REF_MV mode comprising NEAR_MV or NEAREST_MV mode) in which no motion vector is transmitted and the current block uses the last or second-to-last non-zero motion vector used by neighboring, previously coded blocks to generate the prediction block. Inter-prediction modes may be used with any of the available reference frames.

The reference motion vector coding modes analyze the available blocks motion activity to produce a ranked reference motion vector candidate list, allowing the size of the reference motion vector modes to be dynamically extended, a generalization of the fixed NEAREST_MV mode and NEAR_MV mode, and improving the efficacy of entropy coding. REF_MV mode represents reference motion vector modes, including NEAR_MV and NEAREST_MV modes, as well as extended modes when the candidate motion vector list shows sufficient variation. The entropy coding system starts with NEW_MV mode, selecting the probability model according to the contexts of the number of reference motion vectors found and, if a neighboring block with matched reference frame is found, determining the likelihood that the neighboring block is coded in NEW_MV mode. If the coding mode is not NEW_MV mode, the codec continues to code if the mode is ZERO_MV mode. The codec selects the mode probability model according to the contexts when the collocated block in the previous frame is using a zero motion vector, or close to zero motion vector (i.e., less than 1 full pixel in both row and column components), or when the spatial neighboring blocks are using zero, or close to zero, motion vectors. If the coding mode is not ZERO_MV mode, the codec decides between the REF_MV modes. The associated context is how many reference motion vectors are checked into the candidate list and the weighing coefficients. The REF_MV mode syntax suggests that the effective motion vector comes from referring to neighboring blocks' coding information. Given the reference frame, a list of such possible reference motion vector candidates includes reference motion vector candidates that are ranked according to their relative distance to the current block and the overlapped amount. The codec needs to decide which one in the list to pick and use. The codec can select the candidate motion vector among the candidate reference motion vectors in the list that would provide the best prediction and send the index associated with that particular candidate motion vector to the decoder.

Next, still referring to FIG. 3, the transform stage 306 transforms the residual into a block of transform coefficients in, for example, the frequency domain. Examples of block-based transforms include the Karhunen-Loève Transform (KLT), the Discrete Cosine Transform (DCT), Walsh-Hadamard Transform (WHT), the Singular Value Decomposition Transform (SVD) and the Asymmetric Discrete Sine Transform (ADST). In one example, the DCT transforms the block into the frequency domain. In the case of DCT, the transform coefficient values are based on spatial frequency, with the lowest frequency (e.g., DC) coefficient at the top-left of the matrix and the highest frequency coefficient at the bottom-right of the matrix.

Figure 4:
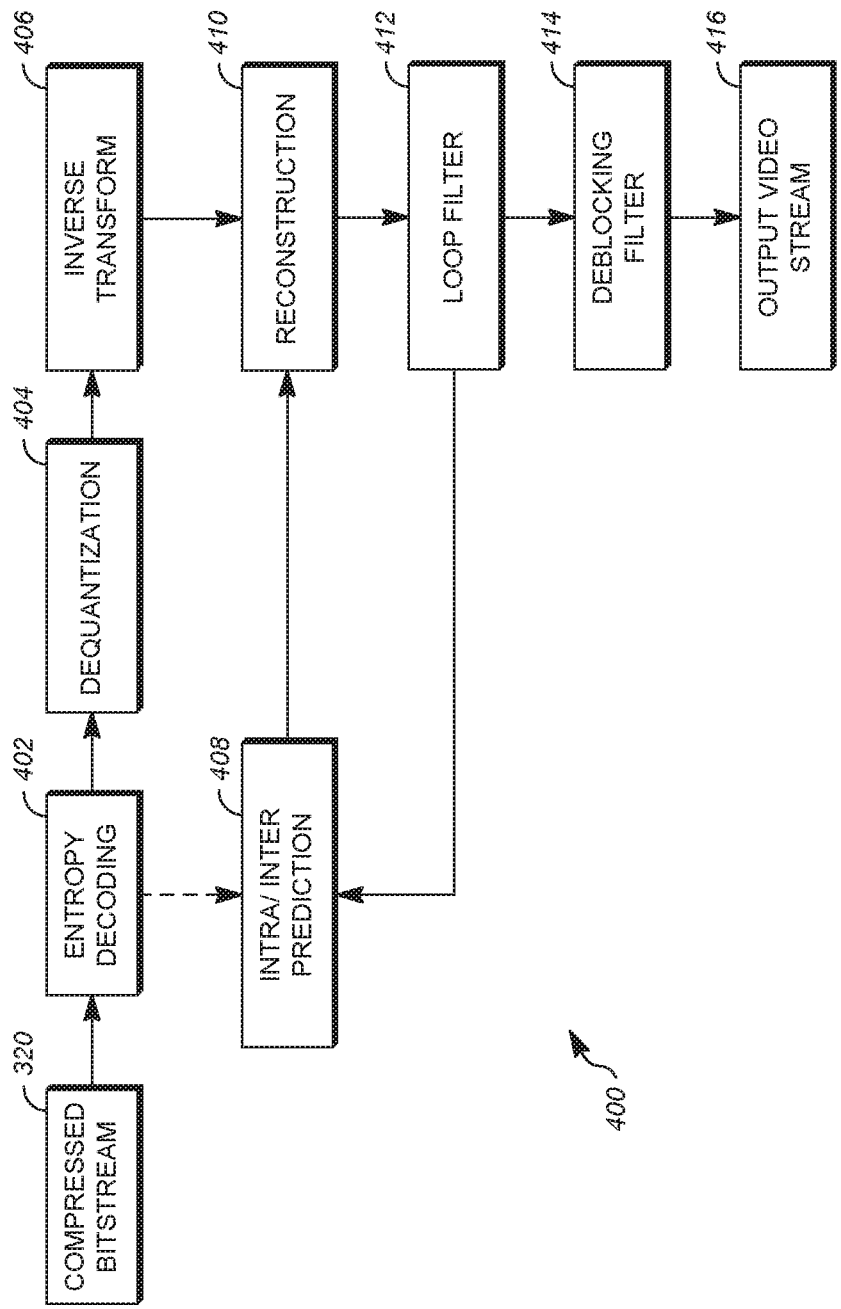
FIG. 4 is a block diagram of a decoder in accordance with implementations of this disclosure.

FIG. 4 is a block diagram of a decoder 400 in accordance with implementations of this disclosure. The decoder 400 can be implemented, for example, in the receiving station 110, such as by providing a computer software program stored in the memory for example. The computer software program can include machine instructions that, when executed by the CPU 112, cause the receiving station 110 to decode video data in the manner described in FIG. 4. The 400 can also be implemented as specialized hardware or firmware in, for example, the transmitting station 102 or the receiving station 110.

The decoder 400, similar to the reconstruction path of the encoder 300 discussed above, includes in one example the following stages to perform various functions to produce an output video stream 416 from the compressed bitstream 320: an entropy decoding stage 402, a dequantization stage 404, an inverse transform stage 406, an intra/inter prediction stage 408, a reconstruction stage 410, a loop filtering stage 412, and a deblocking filtering stage 414. Other structural variations of the decoder 400 can be used to decode the compressed bitstream 320.

When the compressed bitstream 320 is presented for decoding, the data elements within the compressed bitstream 320 can be decoded by the entropy decoding stage 402 (using, for example, arithmetic coding) to produce a set of quantized transform coefficients. The dequantization stage 404 dequantizes the quantized transform coefficients and the inverse transform stage 406 inverse transforms the dequantized transform coefficients to produce a derivative residual that can be identical to that created in the encoder 300. Using header information decoded from the compressed bitstream 320, the decoder 400 can use the intra/inter prediction stage 408 to create the same prediction block as was created in the encoder 300, e.g., at the intra/inter prediction stage 304. In the case of inter prediction, the reference frame from which the prediction block is generated may be transmitted in the bitstream or constructed by the decoder using information contained within the bitstream.

At the reconstruction stage 410, the prediction block can be added to the derivative residual to create a reconstructed block that can be identical to the block created by the reconstruction stage 316 in the encoder 300. In some implementations, the loop filtering stage 412 can be applied to the reconstructed block to reduce blocking artifacts. The deblocking filtering stage 414 can be applied to the reconstructed block to reduce blocking distortion, and the result is output as an output video stream 416. The output video stream 416 can also be referred to as a decoded video stream and the terms will be used interchangeably herein.

Other variations of the decoder 400 can be used to decode the compressed bitstream 320. For example, the decoder 400 can produce the output video stream 416 without the deblocking filtering stage 414.

Figure 5:
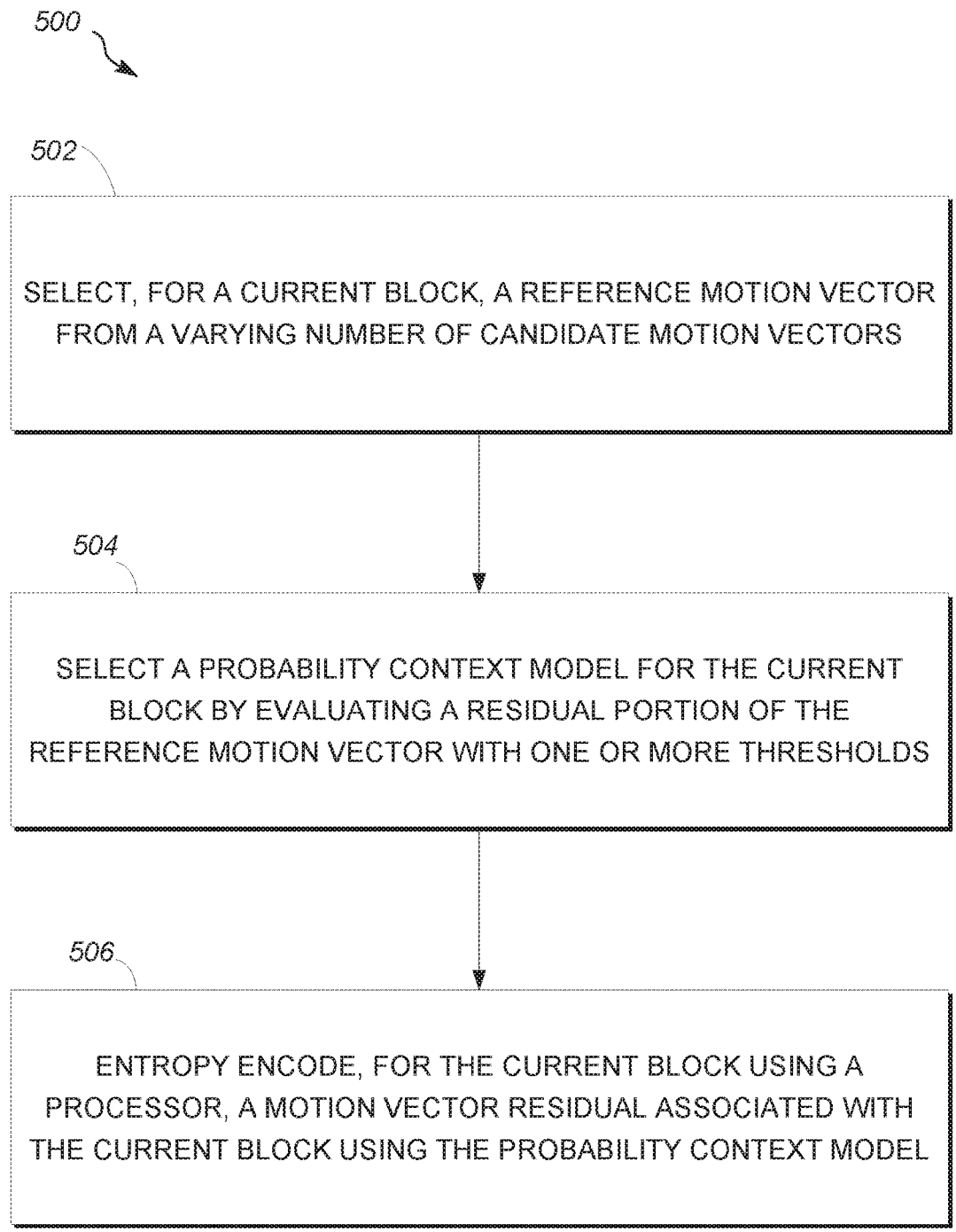
FIG. 5 is a flow diagram of an example process for encoding motion vectors for a video stream using reference motion vectors in accordance with implementations of this disclosure.

FIG. 5 is a flow diagram showing an example process 500 for encoding motion vectors for a video stream using reference motion vectors in accordance with implementations of this disclosure. The process 500 can be implemented in an encoder such as the encoder 300 (shown in FIG. 3) and can be implemented, for example, as a software program that can be executed by computing devices such as the transmitting station 102 or the receiving station 110 (shown in FIG. 1). For example, the software program can include machine-readable instructions that can be stored in a memory such as the memory 106 or the memory 114, and that can be executed by a processor, such as the CPU 104, to cause the computing device to perform the process 500.

The process 500 can be implemented using specialized hardware or firmware. Some computing devices can have multiple memories, multiple processors, or both. The steps of the process 500 can be distributed using different processors, memories, or both. Use of the terms "processor" or "memory" in the singular encompasses computing devices that have one processor or one memory as well as devices that have multiple processors or multiple memories that can each be used in the performance of some or all of the recited steps. For simplicity of explanation, the process 500 is depicted and described as a series of steps. However, steps in accordance with this disclosure can occur in various orders and/or concurrently. Additionally, steps in accordance with this disclosure may occur with other steps not presented and described herein. Furthermore, not all illustrated steps may be required to implement a method in accordance with the disclosed subject matter.

The process 500 assumes that a stream of video data having multiple frames, each having multiple blocks, is being encoded using a video encoder such as the video encoder 300 executing on a computing device such as the transmitting station 102. The video data or stream can be received by the computing device in any number of ways, such as by receiving the video data over a network, over a cable, or by reading the video data from a primary memory or other storage device, including a disk drive or removable media such as a CompactFlash (CF) card, Secure Digital (SD) card, or any other device capable of communicating video data. In some implementations, video data can be received from a video camera connected to the computing device operating the encoder. At least some of the blocks within frames are encoded using inter prediction as described in more detail below.

At 502, the process 500 selects, for a current block of the video stream, a reference motion vector from a varying number of candidate reference motion vectors. The current block is located in a current frame of the video bitstream. The candidate reference motion vectors can include motion vectors from any previously coded blocks in the video stream. The previously coded blocks can include any block encoded using inter-prediction before the current block, such as a block from a previously coded frame, or a block from the same frame as the current block that has been encoded before the current block.

The previously coded blocks can include, for example, a block located in the current frame that is coded prior to the current block. For example, in some encoding/decoding (codec) schemes such as ones that code in raster scan order, the previously coded blocks can include a block to the left of the current block, a block to the above left of the current block, a block to the above right of the current block, a block above the current block, or the like.

The previously coded blocks can also include a block located in a reference frame of the current frame in the video bitstream. For example, the candidate reference blocks can include a co-located block of the current block in the reference frame, and at least one of the following blocks in the reference frame, such as a block to the right of the co-located block, a block below the co-located block, a block to the bottom-left of the co-located block, and a block to the bottom-right of the co-located block. The reference frame may be a temporally adjacent frame (such as last frame) or a temporally non-adjacent frame (such as the golden frame or the alternate frame). For example, the reference frame can be an immediately preceding frame of the current frame (e.g., last frame), a block from the golden frame (e.g., described at the intra/inter prediction stage 304), a block from any other reference frame, or any combination of the above.

In some implementations, the candidate reference motion vectors can be obtained from previously coded blocks that correspond in some way to the current block based on the theory that such blocks, due to the proximity of their pixels to the current block, are likely to have similar motion characteristics to the current block. For example, the process 500 can analyze the motion activity of previously coded blocks to produce a list of ranked candidate reference motion vectors, employing an efficient reference motion vector ranking system, and provides a dynamic motion referencing mode that fully accounts for the available motion vector candidate list, which allows the number of the reference motion vector modes to be dynamically extended or shortened and improves the efficacy of entropy coding. The list of the candidate reference motion vectors can vary, such as be dynamically extended or shortened according to, for example, the neighboring reference block condition for the current block. Correspondingly, the number of candidate reference blocks for the current block can also vary. In addition, the number of candidate reference frames that are considered can also vary. Using a varying number of candidate reference frames and/or a varying number of candidate reference blocks allows the encoder/decoder (codec) to adapt to the variations and adjust the number of candidates based on indicators such as motion characteristics of each individual block and its surroundings, which can improve the coding efficiency of the current block.

In one implementation, the reference block can be selected from a dynamic list of a varying number of candidate reference blocks, which can include one or more of a co-located block in the reference frame, a block to the right of the co-located block in the reference frame, a block below the co-located block in the reference frame, a block to the bottom-left of the co-located block in the reference frame, a block to the bottom-right of the co-located block in the reference frame, a block above the current block in the current frame, a block to the left of the current block in the current frame, a block to the above-left of the current block in the current frame, and a block to the above-right of the current block in the current frame. As discussed above, the number of candidate reference blocks can vary based on, for example, the neighboring reference block condition for the current block.

Still at 502, the reference motion vector is selected from the candidate reference motion vectors. Each candidate reference motion vector can be evaluated by a rate-distortion loop within an encoder that determines the best coding mode for the current block by comparing the rate-distortion cost (e.g., the bit cost against the change in image due to the coding) for each candidate reference motion vector.

In some implementations, a reference motion vector can be selected from the candidate reference motion vectors, based on the candidate motion vector nearest the current block and having the highest priority value. The process 500 can determine, for each candidate motion vector, a distance between the previously coded block associated with the candidate motion vector and the current block. For example, the distance between the previously coded block associated with the candidate motion vector and the current block can be based on the spatial displacement between the pixels in the previously coded block and the collocated pixels in the current block, measured in the unit of pixels. The candidate reference motion vectors are ranked based on the distance, from nearest to furthest, from the previously coded block to the current block and the overlapped length between the previously coded block and the current block. A popularity value can be determined for each candidate motion vector based on how many previously coded pixels in the reference coverage area use that particular candidate motion vector. The more previously coded pixels that use a particular candidate motion vector, the higher the popularity value will be for that particular candidate motion vector. In some implementations, a higher priority can be assigned to candidate reference motion vectors from neighboring reference blocks that share the same reference frame combination. A reference motion vector can be selected from the candidate reference motion vectors, based on the candidate motion vector having the highest priority.

Blocks, including the current block, can be predicted from a single reference frame or more than one reference frame. For example, a compound reference frame can be formed by an average (in some cases weighted average) of two or more frames. For blocks using a single reference frame, the selection can be based on, for example, selecting the motion vector from the candidate reference motion vectors associated with the highest popularity value and associated with the reference block closest to the current block. For blocks with compound reference frames, the process 500 can find, for example, the selection can be based on, for example, the motion vector from reference blocks that share the same reference frame combination with higher priority. When fewer than two candidate reference motion vectors are identified, the candidate reference motion vectors in compound reference frames can be appended with the combinations of reference motion vectors of single reference frames. Other selection criteria can also be used.

In some implementations, the candidate reference motion vectors can be limited to spatial-temporal neighboring motion vectors. That is, the pool of candidate reference motion vectors may be selected from regions neighboring the current block. In some video coding schemes, particularly those where video frames are encoded out of order, it is desirable to include in the pool of candidate reference motion vectors motion information from video frames in the distant past or future. Encoding video frames out of order may occur, for example, in the coding of so-called "alternate reference frames" that are not temporally neighboring to the frames coded immediately before or after them. An alternate reference frame may be a synthesized frame that does not occur in the input video stream or is a duplicate frame to one in the input video stream that is used for prediction and is generally not displayed following decoding. Such a frame can resemble a video frame in the non-adjacent future. Another example in which out of order encoding may occur is through the use of a so-called "golden reference frame," which is a reconstructed video frame that may or may not be neighboring to a current video frame and is stored in memory for use as a reference frame until replaced, e.g., by a new golden reference frame.

The reference motion vector can be used for further processing. Namely, the motion vector of the current block can be encoded using the reference motion vector before processing begins again for the next block of the current frame. In addition, the current block can be encoded according to the process described with respect to FIG. 3. There are several ways to use the reference motion vector in encoding the motion vector of the current block. For example, and as described above, the process 500 may be part of a rate-distortion loop used to select the inter prediction mode for the current block to be encoded. As part of the rate-distortion loop, the actual motion vector for inter prediction of the current block may be determined through a motion search according to any number of techniques. One use of the reference motion vector may include using the reference motion vector as a starting parameter for the motion search algorithm based on the reasoning that the actual motion vector is likely to be close to those used in selecting the reference motion vector. A motion search may alternatively be performed before or in parallel with the process 500.

At 504, the process 500 selects a probability context model for the current block by evaluating a residual portion of the reference motion vector with one or more thresholds. The reference motion vector selected at 502, which is associated with a reference block, includes a predicted portion ("predicted reference motion vector") and a residual portion ("reference motion vector residual"). The selected probability context model can be used, at 506, to encode the motion vector residual for the current block.

As discussed, motion vectors, such as the motion vector for the current block or the reference motion vector selected at 502, can include a predicted portion and a residual portion. For the current block, the predicted portion is the predicted motion vector, i.e., the reference motion vector selected for the current block. The residual portion for the current block is based on a difference between the reference motion vector and the motion vector for the current block. For the reference block, the predicted portion, i.e., the predicted reference motion vector, is the predicted motion vector selected for predicting the reference motion vector, and the residual portion, i.e., the reference motion vector residual, is based on a difference between the predicted reference motion vector and the reference motion vector. FIG. 7, which will be explained below, includes an example of a motion vector for a current block B and a reference motion vector for a reference block R0, each having a predicted portion and a residual portion.

Probability context models can include probability distributions, such as predetermined or updated probability distributions, for encoding a motion vector residual for the current block. Encoding the motion vector residual for the current block can include, for example, entropy coding of the motion vector residual using the selected probability context model. The probability distributions can be updated based on actual coded values.

Context modeling, including selecting probability context models based on contexts such as previously-coded motion vector residuals in the neighborhood of the current block, can provide additional savings in bitrate. Multiple probability context models can be used for entropy coding of motion vector residuals in different contexts. The contexts for entropy coding of motion vectors can based on, for example, motion intensities indicated by the motion vector residuals of the reference blocks (i.e., reference motion vector residuals). For example, when the selected reference block is coded with a small motion vector residual (e.g., below a certain threshold), it is a good indication that the current block may have a relatively small motion vector residual. This can indicate that the current block has weak motion intensity, and a probability context model associated with a category of blocks indicative of weak motion intensity can be selected for the current block. Otherwise, when the selected reference block is coded with a large motion vector residual, it can indicate that the current block may have a relatively large motion vector residual, which indicates strong motion intensity, and a different probability context model associated with a category of blocks indicative of strong motion intensity can be selected for the current block.

To select a probability context model for encoding the motion vector residual of the current block, a magnitude of the residual portion of the reference motion vector can be compared with the one or more thresholds to determine an indication of motion intensity for the current block. For example, the absolute value of each of the horizontal (X) and vertical (Y) components of the residual portion of the reference motion vector can be compared with a predetermined threshold (or predetermined thresholds) to determine whether the magnitude of the reference motion vector residual is small or large. The predetermined threshold can be a pixel value, e.g., 2 or 8 pixels. If both of the X and Y components of the reference motion vector residual are less than the threshold, the magnitude of the reference motion vector residual ("reference residual magnitude") can be determined to be small, and the motion intensity for the current block can be indicated to be weak. If either X or Y component of the reference motion vector residual is equal to or larger than the threshold, the reference residual magnitude can be determined to be large, which can indicate the current block to have a large motion vector residual, and the motion intensity for the current block can be indicated to be strong. FIG. 8, which will be explained below, includes two example probability context models that can be used to encode the motion vector residuals for blocks of different motion intensities. In the example of FIG. 8, when both of the vertical and horizontal components of the residual portion of the reference motion vector are less than the threshold (e.g., 8 pixels), the probability context model of "Category 0" for blocks indicated to have weak motion intensities, will be selected. Otherwise, "Category 1" will be selected. The magnitude can also be determined in other ways, for example, as a square root of a squared sum of the X and Y components, etc.

Based on the selected probability context model, the effective (actual) probability value for entropy coding the motion vector residual of the current block can be determined using the magnitude of the motion vector residual of the current block. The probability values can be used for entropy coding of the motion vector residual, using techniques such as arithmetic coding. FIG. 8, which will be discussed after FIG. 7, includes two example probability context models from which a probability context model can be selected for the current block, which can be used to determine an effective probability value for entropy coding the motion vector residual for the current block.

FIG. 7 is a diagram of an example frame 700 including a current block B and blocks that have been coded before the current block B, e.g., blocks R0, R1, and R2 to the left of or above the current block B. In this example, for illustrative purposes, the candidate reference motion vectors include motion vector pmv0 from the block R0 above the current block B, a motion vector pmv1 from the block R1 to the left of the current block B, and a motion vector pmv2 from the block R2 to the above-left of the current block B. The candidate reference motion vectors can also include motion vectors from other blocks in the frame 700 or other frames. In this example, the reference block is selected as the block R0, the block above the block B. Consequently, the motion vector pmv0 of the block R0 is the reference motion vector for the block B. Each block, including the block B and the reference block (the block R0 in this example) selected for the block B, can have a motion vector that includes (and coded) in two portions: a predicted portion and a residual portion.

In FIG. 7, the block B has a motion vector my, which includes a predicted portion pmv0 and a residual portion res0. The predicted portion, i.e., the reference motion vector pmv0, is associated with the reference block R0, the selected reference block in this example. The residual portion, res0, is based on a difference between the reference motion vector pmv0 and the motion vector my for block B. For the reference block R0, the motion vector pmv0 can include a predicted portion, which is the reference motion vector for the reference block R0 (ppmv in FIG. 7), and a residual portion (pres0 in FIG. 7), which is the difference between the reference motion vector pmv0 and the predicted reference motion vector ppmv for the block R0. Either of the predicted portion or the residual portion can be zero. For example, when the residual portion is zero, a block such as the block B or the reference block R0 can be directly predicted from its reference block using the reference motion vector.

The process 500 of encoding (or the process 600 for decoding in FIG. 6) can evaluate the magnitude of the residual portion (e.g., pres0 in FIG. 7) of the reference motion vector (e.g., pmv0 in FIG. 7) to select the probability context model that can be used to code the residual portion of the motion vector of the block B. For example, the absolute values of each of the horizontal (X) and vertical (Y) components of the residual portion pres0 of the block R0 can be compared against a threshold to select the probability context model for block B. The comparison can be based on, for example, comparing both X and Y components of the reference motion vector pres0 with the threshold to determine if both are less than the threshold. The threshold can be, say, 8 pixels in this example. Based on the comparison, the residual magnitude of the reference motion vector can be determined to be large or small, which can be used to select the probability context model from different probability context models, as will be further explained in FIG. 8.

Figure 6:
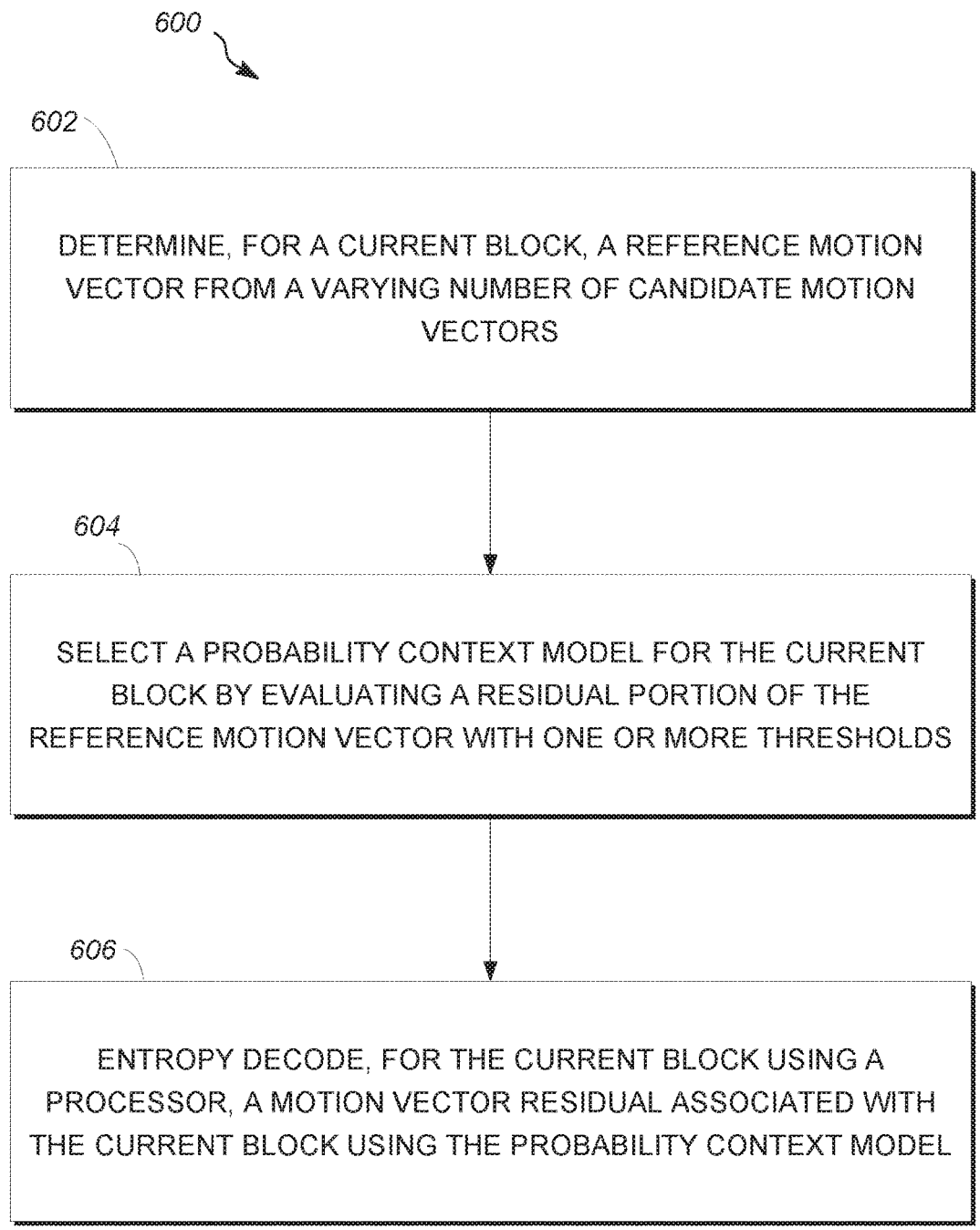
FIG. 6 is a flow diagram of an example process for decoding motion vectors for a video stream using reference motion vectors in accordance with implementations of this disclosure.

FIG. 8 is a diagram of example probability context models used to explain the processes of FIGS. 5 and 6. In this example, two probability context models are shown as "Category 0" and "Category 1". Although only two probability context models are shown, the number of probability context models can be more than two. "Category 0" is a probability context model used for coding blocks (indicated as) showing weak motion intensity, and "Category 1" is a probability context model used for coding blocks showing strong motion intensity. If both of the X and Y components of the reference motion vector residual for the reference block R0, i.e., pres0, is less than the threshold (e.g., 8 pixels), the probability context model for "Category 0" is selected for the current block B. Otherwise, "Category 1" is selected.

In this example, the actual (effective) probability value used for coding the block B can be scaled by 256. In some implementations, the coding process can proceed as a binary tree decision. The process 500 or the process 600 can go through the probability distribution of the selected probability context model, starting from magnitude 0 until it finds the target magnitude value (e.g., the absolute value of X or Y component) for the motion vector residual (e.g., res0 in FIG. 7) of the current block (e.g., the block B). For example, when the magnitude of the motion vector residual res0 is 0 for the block B and block B is determined to be in "Category 0", the (effective) probability to code magnitude 0 for the block B is 80/256. If, however, the block B is determined to belong to Category 1, the probability to code magnitude 0 for the block B is 50/265. When the magnitude for the motion vector residual to be coded for the block B is 1, the effective probability for a block in Category 0 is determined as ((256−80)/256)*(60/256) and the effective probability for a block in Category 1 is ((256−50)/256)*(40/256). In another example, when the magnitude of the motion vector residual to be coded for the block B is 2 and the block B is determined to be in "Category 0", the probability can be determined as ((256−80)/256)*((256−60)/256)*(40/256), and so on. The codec starts with a determination if the magnitude is 0. If not, it will be determined if the magnitude is 1, until it reaches the target magnitude value. Other ways can also be used to determine the probability values for the coding process.

Back to 504, the probability distributions in the context models can be updated, for example, based on a histogram of probability context models determined for some or all blocks in a frame. For example, the context models can be updated once all blocks in a frame are processed (coded or decoded). The context models can also be updated on other basis, such as per macroblock or for a defined group of blocks.

At 506, the process 500 entropy encodes, for the current block using a processor, a motion vector residual associated with the current block using the probability context model. The motion vector residual associated with the current block can be determined as a difference between a motion vector determined for the current block and the reference motion vector.

As discussed, the effective (actual) probability value for entropy coding the motion vector residual of the current block can be determined using the magnitude of the motion vector residual of the current block, based on the selected probability context model at 504. The probability values can be used for entropy coding of the motion vector residual, using techniques such as arithmetic coding. In the example of FIG. 8, when the probability context model associated with "Category 1" blocks is selected, and the magnitude of the motion vector residual of the current block is 1, the effective probability used to entropy code the motion vector residual having a magnitude of 1 can be determined as, for example, ((256−50)/256)*(40/256) by applying a decision tree process to the selected probability context model ("Category 1") starting from magnitude 0 until the target magnitude for the current block is reached. In this example, the target magnitude is 1.

In some implementations, bits can be included in the video stream to identify the encoded magnitude of the motion vector and which of the predetermined probability distributions to use to form the motion vector based on the encoded magnitude. One or more bits indicating which reference frame to use in decoding the current block may also be included in the bitstream in some variations. Like its use in differential encoding, the reference motion vector may also be scaled to the extent it is desirable.

The reference motion vector can be used to differentially encode the actual motion vector. For example, a difference value can be calculated by subtracting the reference motion vector from the motion vector used to encode the current block. The difference value can be encoded and included in the video stream. Since the reference motion vector was formed using previously encoded and decoded data, the same data can be available at a decoder to identify the same reference motion vector as was used in forming the motion vector at the encoder, thus no motion vector is required to be encoded and transmitted for the current block. The decoded difference value can be added to the reference motion vector identified by the decoder as described below to form a motion vector to decode the current block. Note that the reference motion vector is associated with one of the available reference frames. Therefore, in the event the reference motion vector is associated with a reference frame that is different from the reference frame associated with the actual motion vector, the reference motion vector may be scaled as described previously so as to generate the difference between the reference motion vector and the actual motion vector. In some implementations, a separate indication of the reference frame used would also be encoded into the bitstream.

In some implementations, the reference motion vector may also be used directly in the encoding of the current block. This can occur, for example, when a comparison of the rate-distortion value involved in coding the current block using the motion vector determined by the motion search is higher than that involved in coding the current block using the reference motion vector. In this comparison, the reference frame used would desirably be the one used in selecting the reference motion vector so no scaling is needed. In some cases, the decision as to whether or not to use the reference motion vector may be tied to the difference between the reference motion vector and the motion vector resulting from the search. When the difference is small (or zero), the difference in prediction results for the reference frame resulting from the search using the reference motion vector versus the actual motion vector is also small (or zero). When the reference motion vector is used directly to encode the current block, no motion vector would need to be separately encoded. Instead, one or more bits would be inserted into the bitstream in association with the current block to indicate use of the reference motion vector for encoding.

FIG. 6 is a flow diagram of a process 600 for decoding motion vectors for a video stream using reference motion vectors in accordance with implementations of this disclosure. The decoder can reproduce the same candidate reference motion vectors that were constructed in the process 500, shown in FIG. 5. The decoder can read the index of the bitstream to determine which reference motion vector to use from the candidate reference motion vectors. The process 600 can be implemented, for example, as a software program that may be executed by computing devices such as the transmitting station 102 or the receiving station 110. For example, the software program can include machine-readable instructions that may be stored in a memory such as the memory 106 or the memory 114, and that, when executed by a processor, such as the CPU 104 or the CPU 112, may cause the computing device to perform the process 600. The process 600 can be implemented using specialized hardware or firmware. As explained above, some computing devices may have multiple memories or processors, and the steps of the process 600 can be distributed using multiple processors, memories, or both.

For simplicity of explanation, the process 600 is depicted and described as a series of steps. However, steps in accordance with this disclosure can occur in various orders and/or concurrently. Additionally, steps in accordance with this disclosure may occur with other steps not presented and described herein. Furthermore, not all illustrated steps may be required to implement a method in accordance with the disclosed subject matter.

Desirably, the process 600 substantially conforms to the process 500. There are some differences, however, that are pointed out in the following description of the process 600. Where steps are substantially similar to those in the process 500, reference will be made to the description above.

At 602, the decoder determines, for a current block of the encoded video bitstream, a reference motion vector from a varying number of candidate reference motion vectors. The reference motion vector is associated with a reference block and includes a predicted portion and a residual portion. This information can be communicated by reading and decoding bits from an encoded video bitstream that indicate the use of a reference motion vector according to one of the techniques disclosed above. The encoded bitstream (or encoded video data) may have been received by decoder of a computing device in any number of ways, such as by receiving the video data over a network, over a cable, or by reading the video data from a primary memory or other storage device, including a disk drive or removable media such as a DVD, CompactFlash (CF) card, Secure Digital (SD) card, or any other device capable of communicating a video stream. Step 602 involves decoding at least a portion of the encoded video bitstream to extract the information regarding the motion vector for the current block. This information can be included in a header associated with a current block or a frame header, for example. The information in the one or more headers indicate to the decoder that the current block is to be decoded using inter prediction and that the motion vector used for that inter prediction relies on the reference motion vector as described previously. For example, information in the bitstream could indicate that the actual motion vector used in encoding the current block was differentially encoded using the reference motion vector. Alternatively, information could indicate that the reference motion vector was used directly for encoding the current block.

The candidate reference motion vectors can include motion vectors from any previously decoded blocks in the video stream. The previously decoded blocks can include any block decoded using inter-prediction before the current block, such as a block from a previously decoded frame or a block from the same frame as the current block that has been decoded before the current block.

The previously decoded blocks can include, for example, a block located in the current frame that is decoded prior to the current block. For example, in some encoding/decoding (codec) schemes such as ones that code in raster scan order, the previously decoded blocks can include a block to the left of the current block, a block to the above left of the current block, a block to the above right of the current block, a block above the current block, or the like. The previously decoded blocks can also include a block located in a reference frame of the current frame in the video bitstream. For example, the candidate reference blocks can include a co-located block of the current block in the reference frame, and at least one of the following blocks in the reference frame, such as a block to the right of the co-located block, a block below the co-located block, a block to the bottom-left of the co-located block, and a block to the bottom-right of the co-located block.

Once the reference motion vector is determined, the motion vector used to encode the current block can be decoded using the selected reference motion vector. The decoded motion vector may then be used to decode the current block according to the process of FIG. 4.

In some implementations, the process 600 can identify the candidate reference motion vectors from, for example, the above and left neighbor blocks of the same reference frame. The identified candidate reference motion vectors can be accomplished by flags as described previously and/or by rules regarding the selection of candidate reference motion vectors that are available to both the encoder and decoder based on the position of the current block. The candidate reference motion vectors can be ranked based on, for example, the distance between the reference block and the current block and the popularity of each candidate reference motion vector. The distance between the reference block and the current block can be determined for each candidate reference motion vector. The popularity for each candidate reference motion vector can be determined by a popularity value based on a set of previously coded pixel values associated with the particular candidate reference motion vector. The most probable candidate reference motion vector can be assigned as the predicted motion vector for, for example, NEW_MV mode. Additional motion vectors can be assigned to the REF_MV mode, including, for example, NEAREST_MV mode and NEAR_MV mode, based on their relative distance to the current block and the overlapped length between the reference block and the current block and their popularity value. If the list of candidate reference motion vectors includes more than two candidate reference motion vectors, the number of reference motion vector modes can be dynamically extended. It can then be determined whether to use NEW_MV mode or REF_MV mode. When REF_MV mode is selected, process 600 further determines whether to use NEAREST_MV mode or NEAR_MV mode.

In some implementations, if the reference motion vector is used to differentially encode the actual motion vector for the current block, the decoder can decode the motion vector by, for example, decoding an encoded difference value that can then be added to the reference motion vector selected to generate the actual motion vector. Then, the actual motion vector may be used to decode the current block using inter prediction. In other implementations, the reference motion vector can be used to identify a predetermined probability distribution, which can be used to decode a magnitude value of the motion vector used to encode the current block before decoding the current block using the motion vector. Similar to the discussion of FIG. 5, this may involve scaling the reference motion vector. In other implementations, the reference motion vector may be used directly as the motion vector to decode the current block after decoding one or more bits indicating that the reference motion vector should be so used.

At 604, the process 600 selects a probability context model for the current block by evaluating a residual portion of the reference motion vector with one or more thresholds. The reference motion vector determined at 602, which is associated with a reference block, includes a predicted portion (predicted reference motion vector) and a residual portion (reference motion vector residual). The selected probability context model can be used to decode the motion vector residual for the current block. As previously discussed, motion vectors, such as the motion vector for the current block or the reference motion vector selected at 502, can each include a predicted portion and a residual portion.

Probability context models can include probability distributions, such as predetermined or updated probability distributions, for decoding a motion vector residual for the current block. Decoding the motion vector residual for the current block can include, for example, entropy decoding of the motion vector residual using the selected probability context model. The probability distributions can be updated based on actual decoded values. Because the actual values and the decoded values in a lossless coding scheme (e.g., entropy coding) are the same for the encoder and the decoder, the probability context models do not need to be transmitted.

Multiple probability context models can be used for entropy decoding of motion vector residuals in different contexts. The contexts for entropy decoding of motion vectors can based on, for example, motion intensities indicated by the motion vector residuals of the reference blocks. For example, when the selected reference block is decoded with a small motion vector residual (e.g., below a certain threshold), it is a good indication that the current block may have a relatively small motion vector residual. This can indicate that the current block has weak motion intensity, and a probability context model associated with a category of blocks indicative of weak motion intensity can be selected for the current block. Otherwise, a different probability context model associated with a category of blocks indicative of strong motion intensity can be selected for the current block.

To select a probability context model for decoding the motion vector residual of the current block, a magnitude of the residual portion of the reference motion vector can be compared with the one or more thresholds to determine an indication of motion intensity for the current block.

At 606, the process 600 entropy decodes, for the current block, a motion vector residual associated with the current block using the probability context model.

Based on the probability context model selected at 604, the effective (actual) probability value for entropy decoding the motion vector residual of the current block can be determined using the magnitude of the motion vector residual of the current block. The probability values can be used for entropy decoding of the motion vector residual, using techniques such as arithmetic coding. In the example of FIG. 8, when the probability context model associated with "Category 1" blocks is selected, and the magnitude of the motion vector residual of the current block is 1, the effective probability used to entropy decode the motion vector residual having a magnitude of 1 can be determined as, for example, ((256−50)/256)*(40/256) by applying a decision tree process to the selected probability context model ("Category 1") starting from magnitude 0 until the target magnitude for the current block is reached. In this example, the target magnitude is 1.

In some implementations, bits can be included in the video stream to identify the encoded magnitude of the motion vector and which of the predetermined probability distributions to use to form the motion vector based on the encoded magnitude, which can be decoded by the process 600. One or more bits indicating which reference frame to use in decoding the current block may also be included in the bitstream in some variations.

Once the motion vector and current block are decoded, the next block may be processed. In the next block is inter coded, the process 600 may be repeated. A frame can be reconstructed from the blocks derived from reconstructed values by intra or inter prediction, or both. The output can be an output video stream, such as the output video stream 416 shown in FIG. 4.

Figure 9:
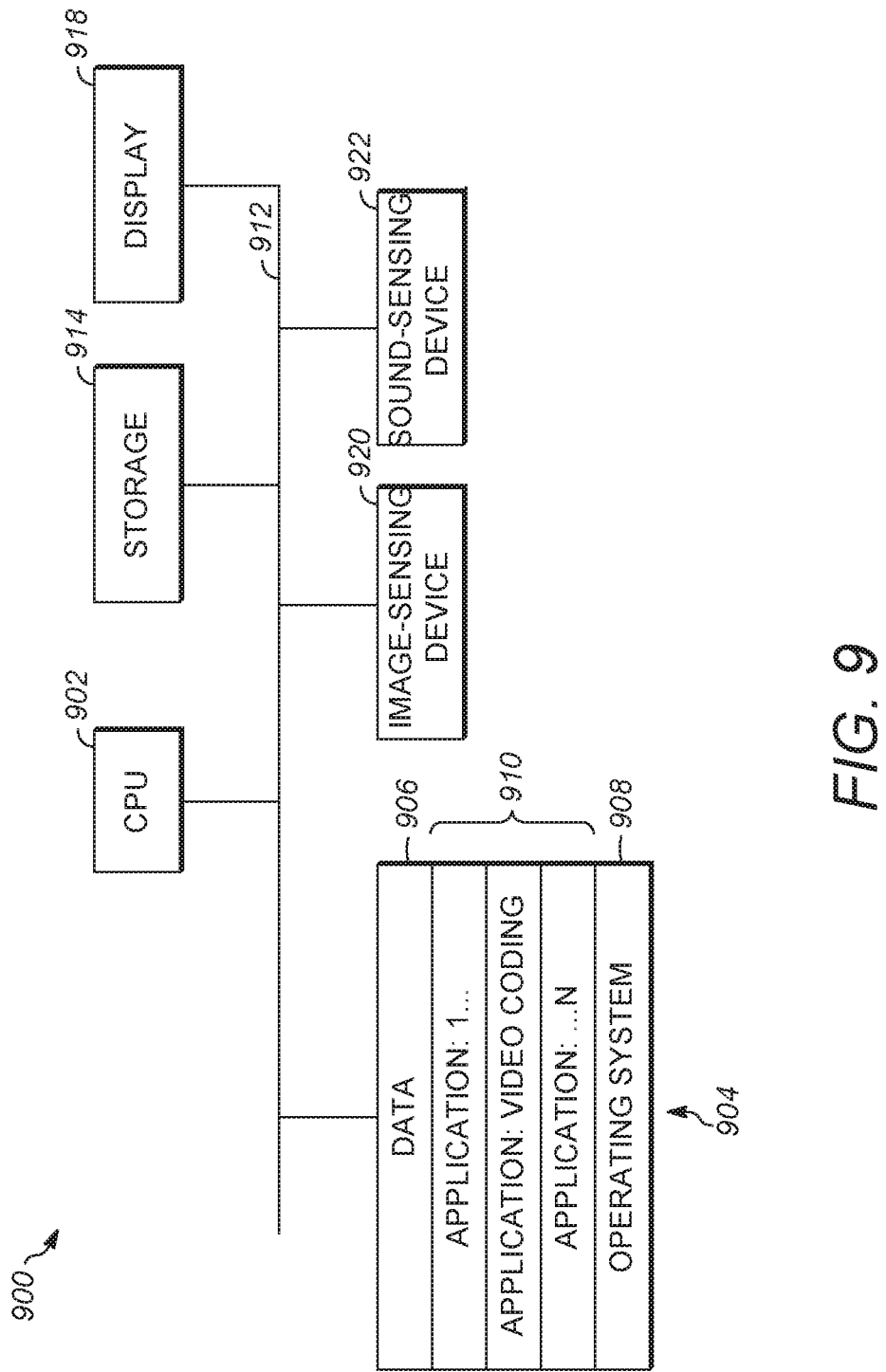
FIG. 9 is a block diagram of an example of a computing device that can implement a transmitting station or a receiving station.

FIG. 9 is a block diagram of an example of a computing device 900 that can implement a transmitting station or a receiving station. For example, the computing device 900 can implement one or both of the transmitting station 102 and the receiving station 110 of FIG. 1. The computing device 900 can be in the form of a computing system including multiple computing devices, or in the form of a single computing device, for example, a mobile phone, a tablet computer, a laptop computer, a notebook computer, a desktop computer, and the like.

A CPU 902 in the computing device 900 can be a conventional central processing unit. Alternatively, the CPU 902 can be any other type of device, or multiple devices, capable of manipulating or processing information now-existing or hereafter developed. Although the disclosed implementations can be practiced with a single processor as shown, e.g., the CPU 902, advantages in speed and efficiency can be achieved using more than one processor.

A memory 904 in the computing device 900 can be a read only memory (ROM) device or a random access memory (RAM) device in an implementation. Any other suitable type of storage device can be used as the memory 904. The memory 904 can include code and data 906 that is accessed by the CPU 902 using a bus 912. The memory 904 can further include an operating system 908 and application programs 910, the application programs 910 including at least one program that permits the CPU 902 to perform the methods described here. For example, the application programs 910 can include applications 1 through N, which further include a video coding application that performs the methods described here. The computing device 900 can also include a secondary storage 914, which can, for example, be a memory card used with a mobile computing device. Because the video communication sessions may contain a significant amount of information, they can be stored in whole or in part in the secondary storage 914 and loaded into the memory 904 as needed for processing.

The computing device 900 can also include one or more output devices, such as a display 918. The display 918 may be, in one example, a touch sensitive display that combines a display with a touch sensitive element that is operable to sense touch inputs. The display 918 can be coupled to the CPU 902 via the bus 912. Other output devices that permit a user to program or otherwise use the computing device 900 can be provided in addition to or as an alternative to the display 918. When the output device is or includes a display, the display can be implemented in various ways, including by a (LCD, a CRT display or a LED display, such as an OLED display.

The computing device 900 can also include or be in communication with an image-sensing device 920, for example a camera, or any other image-sensing device 920 now existing or hereafter developed that can sense an image such as the image of a user operating the computing device 900. The image-sensing device 920 can be positioned such that it is directed toward the user operating the computing device 900. In an example, the position and optical axis of the image-sensing device 920 can be configured such that the field of vision includes an area that is directly adjacent to the display 918 and from which the display 918 is visible.

The computing device 900 can also include or be in communication with a sound-sensing device 922, for example a microphone, or any other sound-sensing device now existing or hereafter developed that can sense sounds near the computing device 900. The sound-sensing device 922 can be positioned such that it is directed toward the user operating the computing device 900 and can be configured to receive sounds, for example, speech or other utterances, made by the user while the user operates the computing device 900.

Although FIG. 9 depicts the CPU 902 and the memory 904 of the computing device 900 as being integrated into a single unit, other configurations can be utilized. The operations of the CPU 902 can be distributed across multiple machines (each machine having one or more of processors) that can be coupled directly or across a local area or other network. The memory 904 can be distributed across multiple machines such as a network-based memory or memory in multiple machines performing the operations of the computing device 900. Although depicted here as a single bus, the bus 912 of the computing device 900 can be composed of multiple buses. Further, the secondary storage 914 can be directly coupled to the other components of the computing device 900 or can be accessed via a network and can comprise a single integrated unit such as a memory card or multiple units such as multiple memory cards. The computing device 900 can thus be implemented in a wide variety of configurations.

The aspects of encoding and decoding described above illustrate some exemplary encoding and decoding techniques. However, it is to be understood that encoding and decoding, as those terms are used in the claims, could mean compression, decompression, transformation, or any other processing or change of data.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of the transmitting station 102 and/or the receiving station 110 (and the algorithms, methods, instructions, etc., stored thereon and/or executed thereby, including by the encoder 300 and the decoder 400) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of the transmitting station 102 and the receiving station 110 do not necessarily have to be implemented in the same manner.

Further, in one aspect, for example, the transmitting station 102 or the receiving station 110 can be implemented using a general purpose computer or general purpose processor with a computer program that, when executed, carries out any of the respective methods, algorithms and/or instructions described herein. In addition or alternatively, for example, a special purpose computer/processor can be utilized that contains other hardware for carrying out any of the methods, algorithms, or instructions described herein.

The transmitting station 102 and the receiving station 110 can, for example, be implemented on computers in a video conferencing system. Alternatively, the transmitting station 102 can be implemented on a server and the receiving station 110 can be implemented on a device separate from the server, such as a hand-held communications device. In this instance, the transmitting station 102 can encode content using an encoder into an encoded video signal and transmit the encoded video signal to the communications device. In turn, the communications device can then decode the encoded video signal using a decoder. Alternatively, the communications device can decode content stored locally on the communications device, for example, content that was not transmitted by the transmitting station 102. Other suitable implementation schemes of the transmitting station 102 and the receiving station 110 are available. For example, the receiving station 110 can be a generally stationary personal computer rather than a portable communications device and/or a device including the encoder 300 may also include the decoder 400.

Further, all or a portion of implementations of the present disclosure can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations and aspects have been described in order to allow easy understanding of the present disclosure and do not limit the present disclosure. On the contrary, the disclosure is intended to cover various modifications and equivalent arrangements included within the scope of the appended claims, which scope is to be accorded the broadest interpretation so as to encompass all such modifications and equivalent structure as is permitted under the law.

What is claimed is:

1. A method for decoding a video bitstream, comprising:
   determining, for a current block of the video bitstream, a reference motion vector from a number of candidate reference motion vectors, wherein the reference motion vector is associated with a reference block and includes a predicted portion and a residual portion;
   selecting a probability context model for the current block by evaluating the residual portion of the reference motion vector with one or more thresholds, wherein the selecting comprises:
      comparing a magnitude of the residual portion of the reference motion vector with the one or more thresholds to determine an indication of likelihood of motion intensity for the current block; and
      selecting the probability context model from a plurality of probability context models based on the indication of likelihood of motion intensity for the current block; and
   entropy decoding, for the current block using a processor, a motion vector residual associated with the current block using the probability context model, wherein the motion vector residual is determined as a difference between a motion vector determined for the current block and the reference motion vector.

2. The method of claim 1, wherein the current block is located in a current frame of the video bitstream, and the reference block is a previously decoded block located in the current frame, or a block located in a reference frame of the current frame of the video bitstream.

3. The method of claim 2, wherein the reference frame is selected from a first number of candidate reference frames for the current frame, and the reference frame includes, for the current block, a second number of candidate reference blocks including a co-located block of the current block and at least one of: a block to the right of the co-located block, a block below the co-located block, a block to the bottom-left of the co-located block, and a block to the bottom-right of the co-located block.

4. The method of claim 2, wherein the reference block is selected from a dynamic list of a varying number of candidate reference blocks, the candidate reference blocks comprising at least one of: a co-located block in the reference frame, a block to the right of the co-located block in the reference frame, a block below the co-located block in the reference frame, a block to the bottom-left of the co-located block in the reference frame, a block to the bottom-right of the co-located block in the reference frame, a block above the current block in the current frame, a block to the left of the current block in the current frame, a block to the above-left of the current block in the current frame, and a block to the above-right of the current block in the current frame.

5. The method of claim 1, wherein the plurality of probability context models comprises a first probability context model associated with a first category of blocks indicative of strong motion intensity and a second probability context model associated with a second category of blocks indicative of weak motion intensity.

6. The method of claim 1, wherein the plurality of probability context models is updated based on a histogram of probability context models determined for some or all blocks in a frame.

7. A method for encoding a video stream, comprising:
selecting, for a current block of the video stream, a reference motion vector from a number of candidate reference motion vectors, wherein the reference motion vector is associated with a reference block and includes a predicted portion and a residual portion;
selecting a probability context model for the current block by evaluating the residual portion of the reference motion vector with one or more thresholds, wherein the selecting comprises:
comparing a magnitude of the residual portion of the reference motion vector with the one or more thresholds to determine an indication of likelihood of motion intensity for the current block; and
selecting the probability context model from a plurality of probability context models based on the indication of likelihood of motion intensity for the current block; and
entropy encoding, for the current block using a processor, a motion vector residual associated with the current block using the probability context model, wherein the motion vector residual associated with the current block is determined as a difference between a motion vector determined for the current block and the reference motion vector.

8. The method of claim 7, wherein the current block is located in a current frame of the video stream, and the reference block is a previously coded block located in the current frame, or a block located in a reference frame of the current frame in the video stream.

9. The method of claim 8, wherein the reference frame is selected from a first number of candidate reference frames for the current frame, and the reference frame includes, for the current block, a second number of candidate reference blocks including a co-located block of the current block and at least one of the following blocks in the reference frame: a block to the right of the co-located block, a block below the co-located block, a block to the bottom-left of the co-located block, and a block to the bottom-right of the co-located block.

10. The method of claim 8, wherein the reference block is selected from a dynamic list of a varying number of candidate reference blocks, the candidate reference blocks comprising at least one of: a co-located block in the reference frame, a block to the right of the co-located block in the reference frame, a block below the co-located block in the reference frame, a block to the bottom-left of the co-located block in the reference frame, a block to the bottom-right of the co-located block in the reference frame, a block above the current block in the current frame, a block to the left of the current block in the current frame, a block to the above-left of the current block in the current frame, and a block to the above-right of the current block in the current frame.

11. The method of claim 7, wherein the plurality of probability context models comprises a first probability context model associated with a first category of blocks indicative of strong motion intensity and a second probability context model associated with a second category of blocks indicative of weak motion intensity.

12. The method of claim 7, wherein the plurality of probability context models is updated based on a histogram of probability context models determined for some or all blocks in a frame.

13. An apparatus for decoding a video bitstream, comprising:
a memory; and
a processor configured to execute instructions stored in the memory to:
determine, for a current block of the video bitstream, a reference motion vector from a number of candidate reference motion vectors, wherein the reference motion vector is associated with a reference block and includes a predicted portion and a residual portion;
select a probability context model for the current block by evaluating the residual portion of the reference motion vector with one or more thresholds, comprising:
comparing a magnitude of the residual portion of the reference motion vector with the one or more thresholds to determine an indication of likelihood of motion intensity for the current block; and
selecting the probability context model from a plurality of probability context models based on the indication of likelihood of motion intensity for the current block; and
entropy decode, for the current block, a motion vector residual associated with the current block using the probability context model, wherein the motion vector residual associated with the current block is determined as a difference between a motion vector determined for the current block and the reference motion vector.

14. The apparatus of claim 13, wherein the current block is located in a current frame of the video bitstream, and the reference block is a previously decoded block located in the current frame, or a block located in a reference frame of the current frame in the video bitstream.

15. The apparatus of claim 14, wherein the reference frame is selected from a first number of candidate reference frames for the current frame, and the reference frame includes, for the current block, a second number of candidate reference blocks including a co-located block of the current block and at least one of the following blocks in the reference frame:
a block to the right of the co-located block, a block below the co-located block, a block to the bottom-left of the co-located block, and a block to the bottom-right of the co-located block.

* * * * *